Dec. 6, 1955
L. O. MARKHAM
2,725,906
GULLET TYPE TEETH FOR SAWS
Filed March 4, 1952
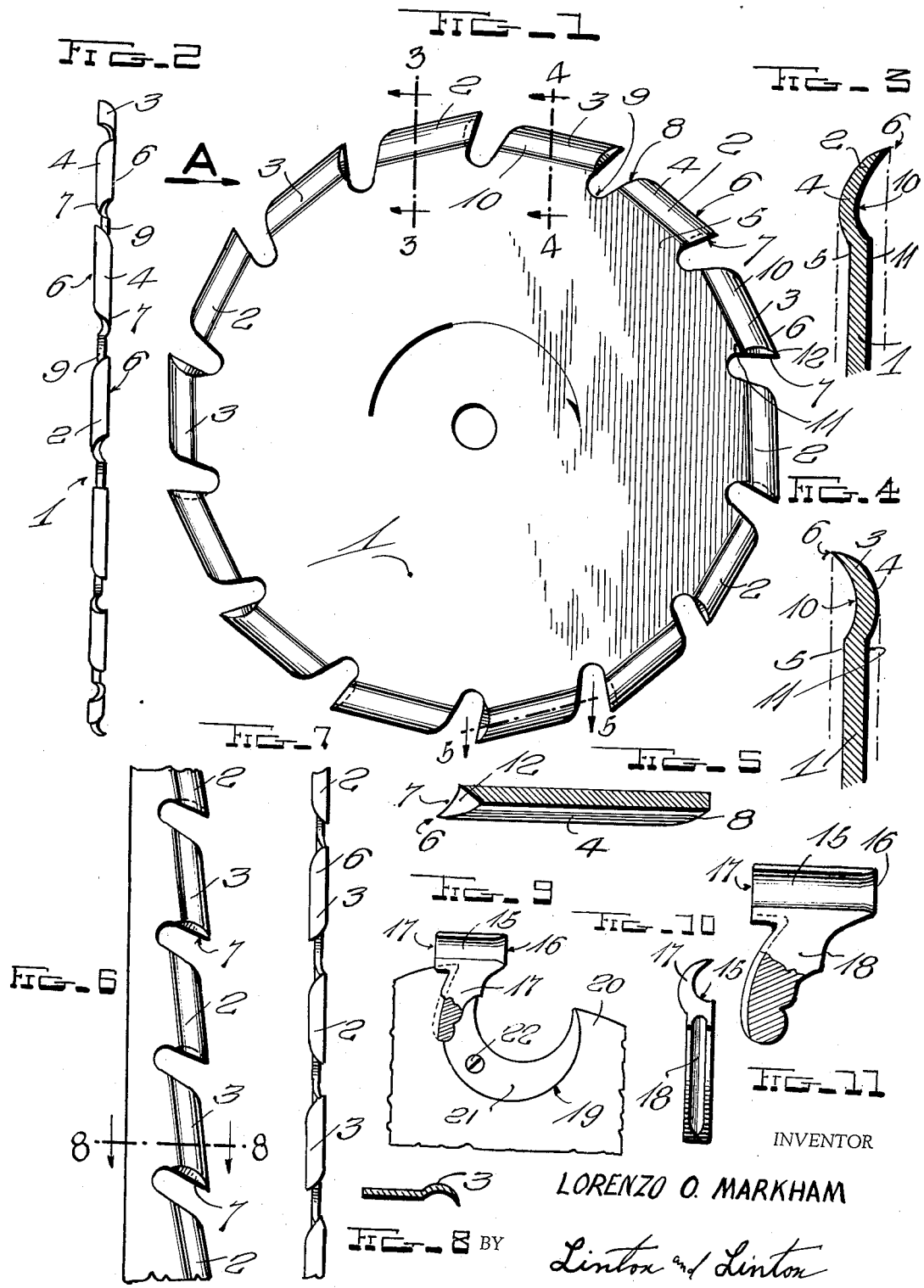
INVENTOR
LORENZO O. MARKHAM
BY
Linton and Linton
ATTORNEYS

United States Patent Office 2,725,906
Patented Dec. 6, 1955

2,725,906

GULLET TYPE TEETH FOR SAWS

Lorenzo O. Markham, Olympia, Wash.

Application March 4, 1952, Serial No. 274,685

1 Claim. (Cl. 143—133)

The present invention relates to saws primarily for cutting wood and is more particularly directed to an improvement in saw teeth of the gullet type.

The principal object of the invention is to provide a saw tooth which can be used for both ripping wood lengthwise of the grain or cross-cutting the wood, and which teeth can be either of the fixed or insertable type for use on all forms of saws such as circular saws, band saws and the like.

A further and important object of the invention is to provide an improvement in gullet type saw teeth which teeth will cut faster than previously known saw teeth, remain sharp longer, has the set built into the teeth making the teeth easy to sharpen even by unexperienced persons and does not have to be jointed or gummed out.

Still further objects of the invention will be in part obvious and in part pointed out in the following description of the accompanying drawings, in which Fig. 1 is a side elevation of a circular saw employing the present teeth;

Fig. 2 is a peripheral view of Fig. 1 looking in the direction of the arrow A;

Fig. 3 is an enlarged cross-sectional view taken on line 3—3 of Fig. 1;

Fig. 4 is also an enlarged cross-sectional view, but taken on line 4—4 of Fig. 1;

Fig. 5 is an enlarged longitudinal section through a saw tooth as taken on line 5—5 of Fig. 1;

Fig. 6 is a section of a band saw blade employing the present teeth;

Fig. 7 is a top edge view of Fig. 6;

Fig. 8 is a cross-section of the band saw blade taken on line 8—8 of Fig. 6;

Fig. 9 is a side sectional view of a circular saw employing insertable teeth of the present type;

Fig. 10 is a side elevation of the saw tooth insert for insertable saws; and,

Fig. 11 is a rear view of said tooth insert.

Referring more particularly to the accompanying drawings wherein like and corresponding parts are designated by similar reference characters, numeral 1 refers to a thin flat circular plate of tempered steel forming the body of a circular saw and having a continuous series of teeth 2 and 3 around the edge thereof. Teeth 2 which alternate with teeth 3 in the series have their outer portion formed substantially concavo-convex in cross-section, as best shown in Fig. 3 of the drawings. The convex side 4 extends laterally of and beyond the face of plate 1. The lower portion 5 of said tooth is a radial extension of one face of plate 1.

Also, as indicated in Fig. 3, tooth 2 has the cross-section thereof tapering inwardly from portion 5 to its peripheral edge where the concave and convex surfaces meet in a sharp edge 6 extending the length of the tooth.

The cutting edge 7 of the tooth 2 is formed only in the concavo-convex section thereof extending on a rearward slant from the convex side back to the concave side thereof providing a curved bit for the tooth. The rear or heel 8 of the tooth extends on a rearward inward slant from the peripheral edge 6 to a gullet 9 from which extends the front of a tooth 3.

The concave side 10 of said tooth also extends from lower portion 11 which is the side opposite to portion 5 and is a radial extension of the opposite face of plate 1. Thus the lower portion of the tooth formed by sides 5 and 11 has substantially parallel sides and is the same width as plate 1. The peripheral edge 6 extends laterally of side 11 thus slightly projecting beyond the face of plate 1 and the tooth is thus set and will remain that way throughout the life of the saw.

Teeth 3 are similar to teeth 2 with which they alternate except that they face in the opposite direction. That is, the concave side 10 of a tooth 3 extends from a side 5 of plate 1 and the convex side 4 from side 11 as shown in Fig. 4. Thus the bits 7 of the teeth in the series alternate from one side to the other of plate 1 to ensure an even clean kerf in the wood being sawed and to prevent jamming in the kerf.

Both teeth 2 and 3 have the peripheral edges 6 slanting inwardly from the edge 7 to the heel 8 resulting in the front point of each tooth extending radially a slightly further distance than the point of the preceding heel allowing the tooth to take a satisfactory bite into the wood as it is presented thereto. The lines formed by the jointure of walls 5 with side 4 or 10 extend substantially parallel to their respective edge 6 as does the concavo-convex section of each tooth.

Teeth 2 and 3 can be equally as well applied to band saws or insertable teeth for circular saws and examples thereof are shown in Figs. 6 to 9 inclusive. In Figs. 6, 7 and 8 a section of a bandsaw is shown, while in Figs. 9, 10 and 11 insertable tooth 15 is shown. Said insertable tooth 15 has a curved cutting edge 16 and is set with the rear end 17 being slightly narrower in width, about .003 of an inch, than the cutting end. A shank 18 is insertable in a recess 19 in circular saw 20 and is retained therein by a semi-circular tooth holder 21 which is affixed by screw 22 to said saw.

The teeth 2, 3, and 15 due to their concavo-convex construction are permanently set and are particularly strong as a result of the width of base of each tooth and the longitudinal rib provided by this formation. It will not, therefore, be necessary to have the teeth reset during the life of the saw. In addition, the curved bit 7 provides considerably more cutting surface than a straight bit of the same radial length and will remain sharp longer as a result of its curved formation. Further, inexperienced workers can sharpen the bit using a round file which is guided by the bit during the reciprocation of the file to ensure the proper sharpening thereof. The gullets of the present saw are positioned below the cutting surface thereof and thus need never be gummed out nor will the teeth need to be jointed due to the concavo-convex construction thereof.

I claim:

An improvement in gullet type saw teeth comprising an elongated tooth whose base portion is of the same thickness as the saw to which the tooth is connected, said tooth having the remaining portion thereof formed concavo-convex and extending on a downward slant from front to heel relative to said base portion, said concavo-convex portion of said tooth terminating in a sharp straight top edge which extends slightly beyond one side of said base portion, the convex side of said concavo-convex portion of the tooth extending slightly beyond the opposite side of said base portion and the front of said tooth having a curved cutting edge formed in the front of said convex side, said tooth having a concave groove extending rearwardly on a lateral slant from said cutting edge to the concave side of said concavo-convex portion of said tooth.

(References on following page)

References Cited in the file of this patent

UNITED STATES PATENTS

| | | |
|---|---|---|
| 31,073 | Brown | Jan. 8, 1861 |
| 105,345 | Littlepage | July 12, 1870 |
| 312,133 | Leward | Feb. 10, 1885 |
| 474,492 | Wilson | May 10, 1885 |
| 1,033,966 | Douglas | July 30, 1912 |
| 2,036,145 | Jewett | Mar. 31, 1936 |
| 2,632,484 | Merz | Mar. 24, 1953 |

FOREIGN PATENTS

| | | |
|---|---|---|
| 88,481 | France | Jan. 8, 1870 |